April 1, 1952
W. C. WHITE
LEAK DETECTOR
Filed April 26, 1950
2,591,485
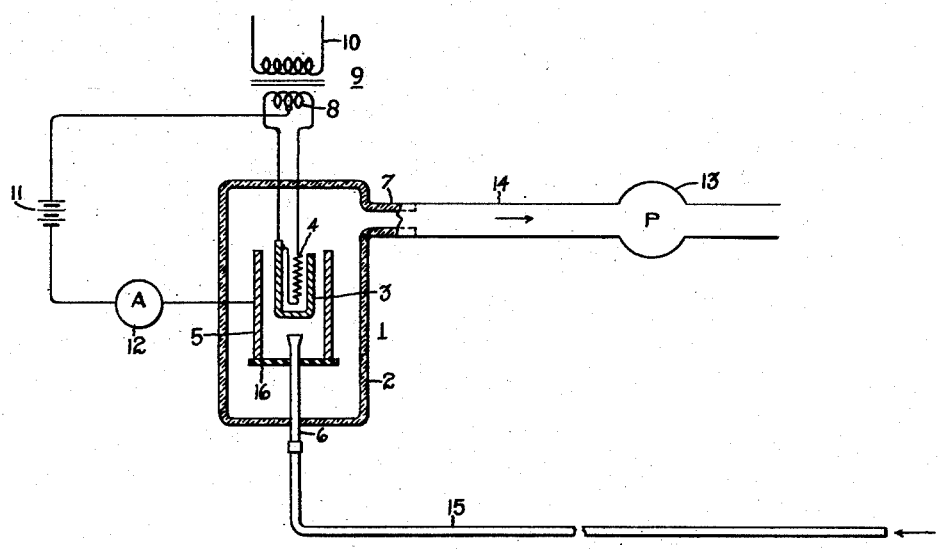
Inventor:
William C. White,
by Paul A. Frank
His Attorney.

Patented Apr. 1, 1952

2,591,485

UNITED STATES PATENT OFFICE 2,591,485

LEAK DETECTOR

William C. White, Schenectady, N. Y., assignor to General Electric Company, a corporation of New York Application April 26, 1950, Serial No. 158,269

5 Claims. (Cl. 175—183)

This invention relates to improvements in the method and apparatus for detecting certain substances present in gases and vapors as described in copending application Serial No. 754,657, filed June 14, 1947, by Chester W. Rice and assigned to the same assignee as the present invention, which is now Patent No. 2,550,498.

In the above-cited application there are described methods and apparatus for introducing certain substances such as vapors, smokes or other particles of matter and gases in an atmosphere, which may be suspected of containing a concentration of the substances to be detected, into an electrical discharge device under conditions which permit the substance to induce positive ion formation at a more positively charged heated electrode, the positive ions so formed being collected by a negatively charged electrode to produce an indicating current which increases with the concentration of the substance. Devices of this type have been found to be qualitatively selective to various substances, that is, they respond only to certain types of substances such as the alkali metals, or other substances having in ionization potential less than the electron work function of the electrodes therein, the halogen elements, or compounds of either. For substances such as the alkali metals and their compounds, such ion formation apparently occurs by ionization of the substance itself when it comes into contact with the heated electrode. For others, such as the halogens and their compounds, the substance appears to cause ion formation only in the presence of what might be called sensitizing compounds such as the alkali metals or their compounds, and it appears in this case that the sensitizing materials themselves are actually ionized to afford the desired positive ion current.

At present, the commercial adaptation of the above-described detector is contained in two parts, a head section and a chassis section, the head section being connected to the chassis by a multi-wire cable several feet long. The head section contains a gas inlet search tube, the sensitive element itself, a blower or pump to suck in the gas to be tested and an exhaust port. The positive ion current actuates a meter or other device contained in the chassis which also contains the power supply for a part of the circuit.

The division of the detector apparatus into head and chassis sections was adopted for very definite reasons. In apparatus of the present type, it is imperative that it be moved and applied in various positions and locations and be extremely sensitive to the presence of the substances to be detected and also that the response to their presence be very rapid. Its recovery to a sensitive condition after having detected the contaminant should also be rapid. An inherent characteristic of the device is that its sensitivity and the time of response decreases as the rate of flow of gas or vapor containing the substance to be detected through the sensitive element increases probably due to the fact that only a smaller proportion of the foreign substance has a sufficient time to contact the anode and thus form positive ions. While it has been suggested that the blower or pump, as well as the discharge tube, be located in the chassis and gas drawn thereto through a long tubing which would greatly reduce the weight of or essentially eliminate the head as now known, the seemingly impossible compromise between sensitivity and the time delay of response to a substance has prevented such a simplification of the apparatus. As pointed out above, to draw a gas at a high rate of flow through the tubing, into and through the sensitive element in order to obtain a quick response to leaks and the like as the outer end of the tubing is passed over a surface, causes the element to be less sensitive due to the lesser contact of the gas or substance with the positively charged electrode or anode.

As a result of the above compromise between sensitivity and time of response when the sensitive element is located in the chassis and the gas or substance to be detected is drawn into the discharge tube through a search tube, it is customary to mount the sensitive element and suction blower or pump in a head unit and the indicating means and other equipment in a chassis unit. Only by this means has it been possible to obtain the desired quick response or generation of positive ion current which is transmitted to the indicating element in the chassis.

While the weight of the head unit is reduced as much as possible, it is still heavy and awkward enough to detract from easy manipulation for the detection of leaks in various equipment on a production basis where each location must be searched or examined with the head in a minimum of time. Also, it is desirable that the relatively fragile sensitive element or tube be remote from a head which is subject to jars and shocks. Furthermore, the multi-wire cable connecting the head and chassis units is subject to rather frequent replacement due to open or short circuiting due to the continual bending of the cable in constant use.

An object of this invention is to provide a simplified apparatus of the above general type.

Another object of the present invention is to provide apparatus of the above type in which the discharge element and pump or blower are located in the chassis instead of in a separate head.

A further object of the invention is to provide apparatus of the above type having the detector equipment in a chassis, with samples drawn through a tubing, which has a high sensitivity and a fast response to the material being tested.

Other objects will become apparent and the invention better understood from a consideration of the following description and the drawing in which the single figure shows a typical embodiment of the present invention.

It has been found that the above objects may be realized very simply.

More particularly, it has been found that apparatus of the above type having the discharge element and blower in the chassis, and having good sensitivity and a fast response time to detectable substances, may be made by using relatively fine tubing or conduit to draw the sample into the space between discharge elements, which has a substantially greater cross section.

In the drawing, the discharge device 1 comprises an envelope 2, a positively charged electrode 3 which is heated by filament 4 and a negative electrode 5. The gas or vapor to be tested enters the envelope 2 through inlet conduit 6 mounted in insulating baffle 16 and exhausts through outlet conduit 7. The heating filament 4 may be energized by any suitable means such as by the secondary 8 of transformer 9 which is energized by power impressed in turn upon its primary coil 10. Any suitable source may be used to establish a potential difference between electrodes 3 and 5 such as battery 11. A microammeter 12 or other current indicating device is connected in series with the electrodes and battery 11 as shown to detect and signal changes in the positive ion current flowing between the electrodes.

In order to provide a desired flow of air or gas through the discharge tube 1, pump 13 is provided in conduit 14 leading from the exhaust port 7 of the discharger. Pump 13 may be mechanical or of the water aspirator variety or of other types, it being preferred that it create a vacuum up to twenty-five inches of water for some applications. The inlet tubing or conduit is shown at 15 and may be arranged readily to connect with conduit 6.

As pointed out above, it is desirable in this type of apparatus that any impurity in a gas or vapor which it is desired to detect cause a quick change in the positive ion current flowing between electrodes 3 and 5 to indicate the presence of the substance. It is also necessary that the flow of the gas or vapor through the discharge tube not be too fast lest the substance being carried in the gas or vapor not have sufficient time to contact positive electrode 3 to produce enough positive ions to give sufficient indication of its presence. Too fast a passage of the gas through discharger 1 thus reduces the sensitivity of the device.

It is likewise apparent that if the search tube 15 has about the same cross-section, say that of a five thirty-second inch inside diameter tube in the proposed apparatus, as when the detecting means is immediately adjacent or close to the gas inlet in the separate head, it would take a relatively long time for the sample of gas to be tested to reach the discharge tube 1.

If the size or inside diameter of the inlet tube or search tube 15 be small and sufficient suction applied the gas to be detected travels through it at a high rate of speed. Furthermore, since the cross-section area of tubing 15 and inlet conduit 6 are substantially smaller than the annular space between the electrodes of the sensitive element, the gas, once inside the element, expands and slows down so as to give the substance contained therein an ample opportunity to contact and quickly produce indicating positive ions at electrode 3. For example, using a search tubing about one-twentieth of an inch in inside diameter and about eight feet long, an indication was given on microammeter 12 of the presence of a detectable substance in an entrant gas after a delay of only about one second. By adjusting the amount of vacuum produced by pump 13, the length of the tubing 15 may be varied, it being kept in mind that conditions should not be so adjusted as to produce too fast a flow through the sensitive element with a resultant loss in sensitivity.

It is necessary that tubing 15 be fabricated of material which will not give off a halogen compound vapor or react with the gases or vapors to be detected. Polyethylene tubing has been found to be resistant to many substances. Polytetrafluoroethylene is another suitable tubing material which is quite inert. Others will occur to those skilled in the art.

By this invention there is provided a quick response device for detecting substances in gas and vapors where the detecting apparatus is all located in a single compact unit which may be kept in a favorable stationary position while the gas or vapor to be detected is sampled through a conveniently held, easily movable and flexible tubing. Whereas formerly a heavy and bulky search head had to be held to the gas source to be tested, now the gas may be sampled by merely holding the end of a long small diameter flexible tube to the source.

The invention is of further advantage in that using the small inlet tube as described herein, the introduction of dust particles which may short circuit the element is minimized. Furthermore, the tube may be easily removed for cleaning and may be made of varying lengths to suit the requirements of any particular job.

What I claim as new and desire to secure by Letters Patent of the United States is:

1. Apparatus for detecting a foreign substance in an atmosphere comprising an electric discharge device including a pair of electrodes, means for imposing an electrical potential difference between said electrodes, means for heating the more positive of said electrodes, means for causing a controlled flow of the atmosphere between said electrodes, said means comprising a vacuum pump and a conduit to the space between said electrodes, said conduit having a cross-sectional area substantially smaller than the space between said electrodes, and means for detecting changes in the current between said electrodes caused by the formation of positive ions in said device due to the presence of the substance.

2. Apparatus as in claim 1 in which the substance is of a class having an ionization potential less than the electron work function of the more positive of the electrodes.

3. Apparatus as in claim 1 wherein said substance is of the class comprising the alkali metals and compounds thereof.

4. Apparatus as in claim 1 wherein said substance is of the class comprising the halogen elements and compounds thereof.

5. The method of operating a detector for foreign atmospheric substance of the type comprising an electrical discharge device including a pair of electrodes, means for imposing an electrical potential between said electrodes, means for heating the more positive of said electrodes, means for detecting changes in the current between said electrodes caused by the formation of positive ions within said device due to the presence of said substance, and means for causing a controlled flow of said atmosphere between said electrodes, which method comprises restricting the cross-sectional flow area of gas flowing toward said electrodes while maintaining relatively unrestricted the cross-sectional flow area of gas flowing past said electrodes.

WILLIAM C. WHITE.

REFERENCES CITED

The following references are of record in the file of this patent:

UNITED STATES PATENTS

| Number | Name | Date |
| --- | --- | --- |
| 1,421,720 | Roberts | July 4, 1922 |
| 1,697,339 | Baker | Jan. 1, 1929 |
| 1,809,115 | Goddard | June 9, 1931 |
| 2,504,772 | White | Apr. 18, 1950 |